US009268455B2

(12) United States Patent
Keller et al.

(10) Patent No.: US 9,268,455 B2
(45) Date of Patent: Feb. 23, 2016

(54) SYSTEM AND METHOD FOR USER-CONTROLLED, MULTI-DIMENSIONAL NAVIGATION AND/OR SUBJECT-BASED AGGREGATION AND/OR MONITORING OF MULTIMEDIA DATA

(75) Inventors: Leo Keller, Rorbas-Freienstein (CH); Francois Rüf, Zurich (CH)

(73) Assignee: NETBREEZE GMBH, Duebendorf (CH)

( * ) Notice: Subject to any disclaimer, the term of this patent is extended or adjusted under 35 U.S.C. 154(b) by 1087 days.

(21) Appl. No.: 12/280,619

(22) PCT Filed: Feb. 23, 2006

(86) PCT No.: PCT/EP2006/060235
§ 371 (c)(1),
(2), (4) Date: Nov. 28, 2008

(87) PCT Pub. No.: WO2007/095997
PCT Pub. Date: Aug. 30, 2007

(65) Prior Publication Data
US 2009/0150832 A1   Jun. 11, 2009

(51) Int. Cl.
*G06F 3/0481* (2013.01)
*G06F 17/30* (2006.01)

(52) U.S. Cl.
CPC ........ *G06F 3/0481* (2013.01); *G06F 17/30958* (2013.01); *G06F 17/30994* (2013.01)

(58) Field of Classification Search
CPC .......................... G06F 3/0481; G06F 17/30864
USPC ........... 715/854, 706, 709; 707/706, 709, 854
See application file for complete search history.

(56) References Cited

U.S. PATENT DOCUMENTS

| 5,544,352 | A  |   | 8/1996  | Egger et al.          |
|-----------|----|---|---------|-----------------------|
| 5,832,494 | A  | * | 11/1998 | Egger et al. ........... 1/1 |
| 6,112,202 | A  | * | 8/2000  | Kleinberg ............. 1/1 |
| 6,285,999 | B1 | * | 9/2001  | Page ................... 1/1 |
| 6,321,220 | B1 | * | 11/2001 | Dean et al. .......... 707/726 |

(Continued)

OTHER PUBLICATIONS

Jau-Yuen Chen et al., Hierarchical Browsing and Search of Large Image Databases, Mar. 2000, IEEE, vol. 9, whole document.*

(Continued)

*Primary Examiner* — Phenuel Salomon
(74) *Attorney, Agent, or Firm* — Thomas Marquis; Kate Drakos; Micky Minhas

(57) ABSTRACT

A system and method for user-controlled multi-dimensional navigation and/or subject-based aggregation of multimedia data, a multiplicity of node elements being generated and a node element including one or more search terms and/or weighting terms that can be logically combined. For each multimedia data element to be registered, a relevance index parameter is determined for each paired combination of node elements and allocated to the respective pair of node elements. In dependence on the relevance index parameters, one- or multi-dimensional distance factors are determined. Based on the registered multimedia data elements and/or node elements, a topological navigation map is generated and graphically displayed in dependence on the respective one- or multi-dimensional distance factors so that the user can navigate in the topological navigation map by an input device and can access required multimedia data elements and/or node elements.

27 Claims, 9 Drawing Sheets

(56) References Cited

U.S. PATENT DOCUMENTS

Figure 1:
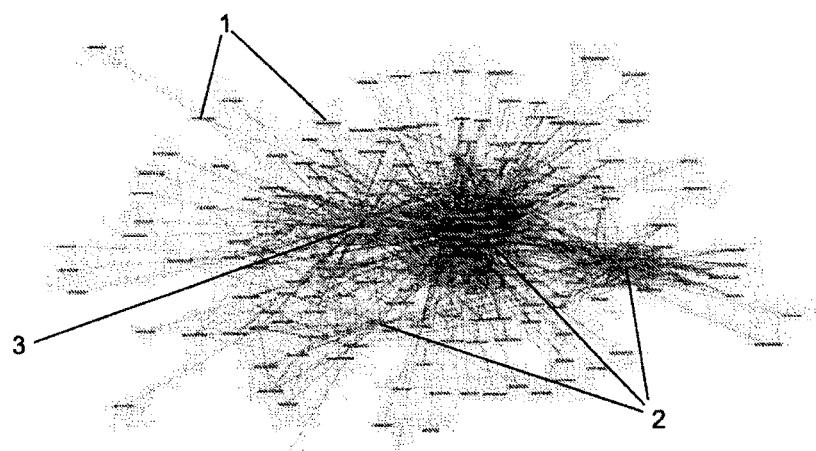

| | | |
|---|---|---|
| 6,356,899 B1 * | 3/2002 | Chakrabarti et al. ......... 707/737 |
| 6,499,026 B1 * | 12/2002 | Rivette et al. .......................... 1/1 |
| 6,704,722 B2 * | 3/2004 | Wang Baldonado ................. 1/1 |
| 7,127,405 B1 * | 10/2006 | Frank et al. .................... 705/310 |
| 7,203,698 B2 * | 4/2007 | Yamashita ............................ 1/1 |
| 7,392,250 B1 * | 6/2008 | Dash et al. .................... 707/776 |
| 7,672,950 B2 * | 3/2010 | Eckardt et al. ............ 707/999.01 |
| 7,797,344 B2 * | 9/2010 | Kaul et al. .................... 707/791 |
| 2002/0111953 A1 * | 8/2002 | Snyder .......................... 707/101 |
| 2002/0120609 A1 * | 8/2002 | Lang et al. ....................... 707/1 |
| 2002/0147738 A1 * | 10/2002 | Reader .......................... 707/500 |
| 2003/0195872 A1 * | 10/2003 | Senn ................................. 707/3 |
| 2004/0083422 A1 * | 4/2004 | Duan et al. .................... 715/500 |
| 2004/0158587 A1 * | 8/2004 | Shay et al. .................... 707/201 |
| 2005/0210009 A1 * | 9/2005 | Tran ................................. 707/3 |

OTHER PUBLICATIONS

Chen, J-Y. et al., "Hierarchical Browsing and Search of Large Image Databases", IEEE Transaction on Image Processing, vol. 9, No. 3, pp. 442-455 (2000).

Chang, C-S. et al., "Supporting Conceptual and Neighborhood Queries on the World Wide Web", IEEE Transactions on Systems, Man, and Cybernetics—Part C: Applications and Reviews, vol. 28, No. 2, pp. 300-308 (1998).

* cited by examiner

SYSTEM AND METHOD FOR USER-CONTROLLED, MULTI-DIMENSIONAL NAVIGATION AND/OR SUBJECT-BASED AGGREGATION AND/OR MONITORING OF MULTIMEDIA DATA

The invention relates to a system and to a method for user-controlled multi-dimensional navigation and/or subject-based aggregation of multimedia data. One or more search terms which can be logically combined are stored in a data memory, a computing unit accessing by a network network nodes connected to source databases and data of the source databases being selected on the basis of the one or more search terms which can be logically combined. The invention relates especially to a system and method for fast navigation and visual registration or accessing of the multimedia data.

The worldwide backbone network, also known as Internet or World Wide Web comprises millions of accessible pages, documents and other data files with information. Without exaggeration, it may be said that this gigantic network of databases arranged decentrally today belongs without doubt to the most important sources for acquiring information in industry, science and technology. The fact that today, gigantic data volumes can be accessed via this network, to an extent as was scarcely imaginable up to ten years ago, is at the same time an enormous technical challenge. This is because, in spite of all the advantages resulting from this, the enormous data volumes also provide the problem of finding really relevant data in this gigantic volume of data. It is only search engines such as, e.g. the familiar Internet search engines, with e.g. the familiar Altavista engine as word-based search engine or, e.g. the Yahoo engine as topic-based search engine which make the multiplicity of decentralized data sources usable for the user since without such aids, the prospect that as many of the relevant data as possible are really found drastically decreases. It may be said that the Internet without search engines is like a motor vehicle without engine. This is found especially in the statistical fact that the users of the Internet spend more on-line time on search engines than anywhere else. In spite of all progresses in this field, however, the search engine technology available in the prior art frequently does not give really satisfactory answers to the user. As an example it should be assumed that a user would like to find information, e.g. on the car model type Fiat Uno, e.g. in conjunction with an action to establish liability of a product liability with respect to a faulty design with technical consequences. General search engines will typically produce a multiplicity of irrelevant links to the keyword "Uno" or "Fiat Uno" with respect to the subject since the search engines cannot recognize the context (in this case the legal juridical context) in which the search term is found. A possible combination of search terms frequently provides little assistance. One of the reasons for this comes from the fact that the Internet search engines usually pursue the strategy of "each document is relevant" which is why they attempt to register and to index each accessible document. Their operation is always based on this unedited selection of documents. A further disadvantage of the search engines of the prior art is that the hierarchy of documents found can be easily manipulated by the provider (URL, title, frequency in the content, Meta Tags etc.) which provides a distorted image of the documents found. A classification of the documents by the provider may be possible for a few individual fields. Because of the enormous quantity of data and since the information can rapidly change in the network (news groups, portals etc.), it is however impossible for a provider to directly classify all relevant documents for all subjects occurring or to interpret them with respect to their content. The situation becomes even more difficult, if, instead of real subjects, general mood tendencies, opinion tendencies or mood fluctuations of the user of the network are to be registered. E.g., it can be of vital importance for a company or industry (for example tobacco, chemistry etc.) to detect the possibilities of a class action (US) or an action to establish liability against themselves early by means of published documents in the Internet and to take corresponding precautions. It is especially for such examples that the traditional search engines cannot be used, or only partially. In particular, they do not allow any effective real-time monitoring which may be necessary in such a case.

But even if the abovementioned disadvantages could be solved in a halfway satisfactory manner by a search engine and the documents could be registered hierarchically in accordance with their relevance to one or more search topics, the multiplicity of documents found with identical or similar relevance in most cases provides the user with an almost unsolvable task of preserving the overview in the case of simple listing or ranking as is normally used today. As mentioned, the punctual relevant information procurement, registration and detection can represent a question of survival in industry today. The question therefore arises whether a relevance-based detection, however good it may be, is still sufficient with today's volumes of data to be a sufficiently meaningful instrument for the user.

Figure 2:
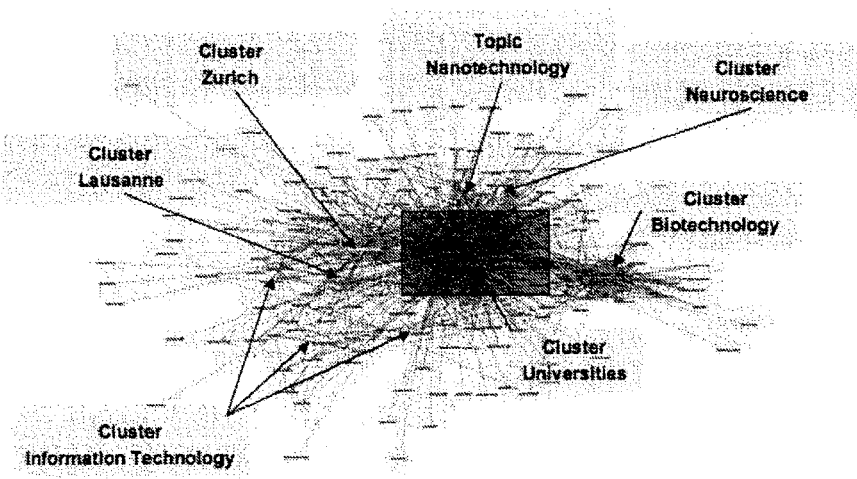
Figure 3:
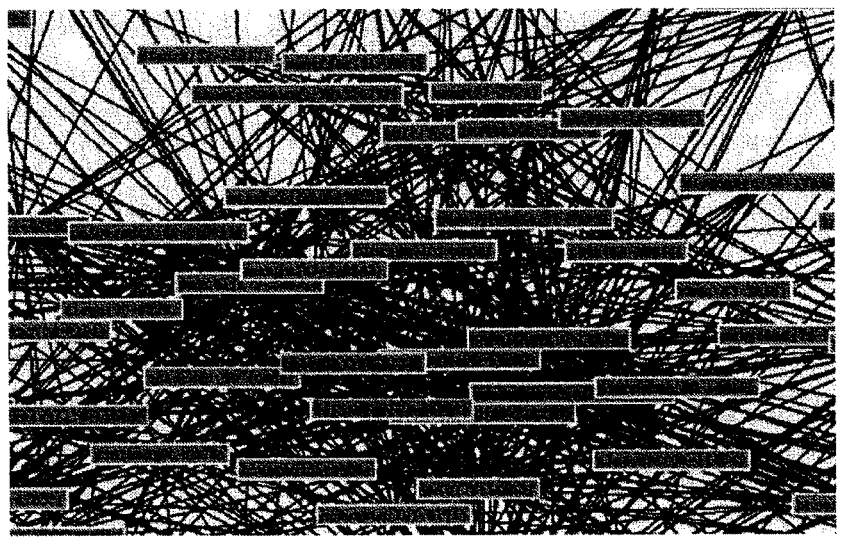
Figure 4:
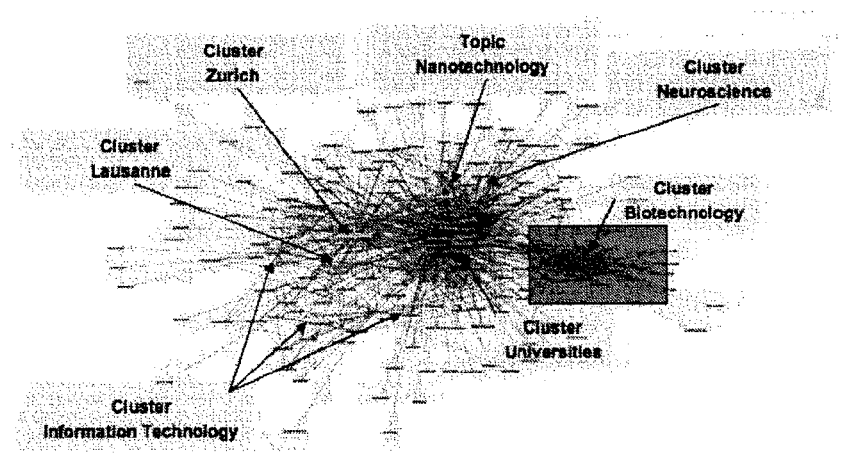
Figure 5:
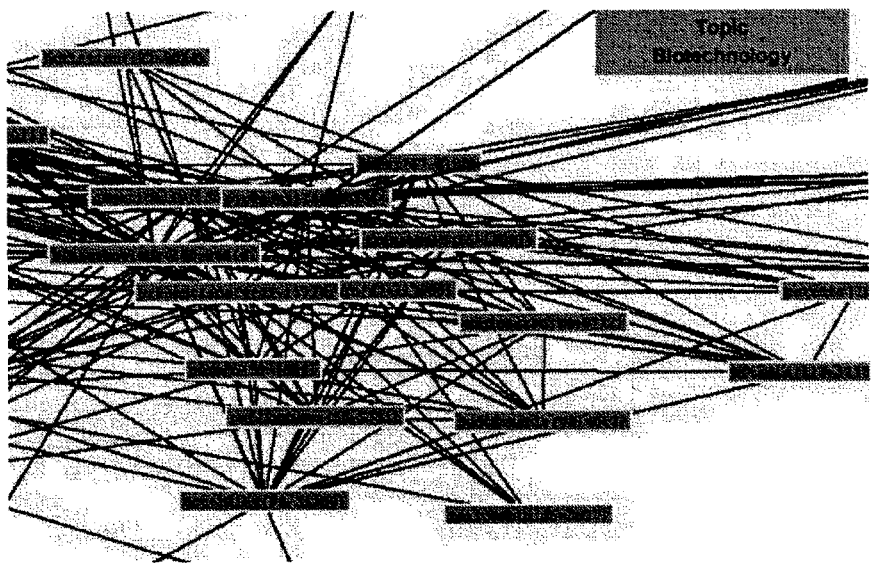
Figure 6:
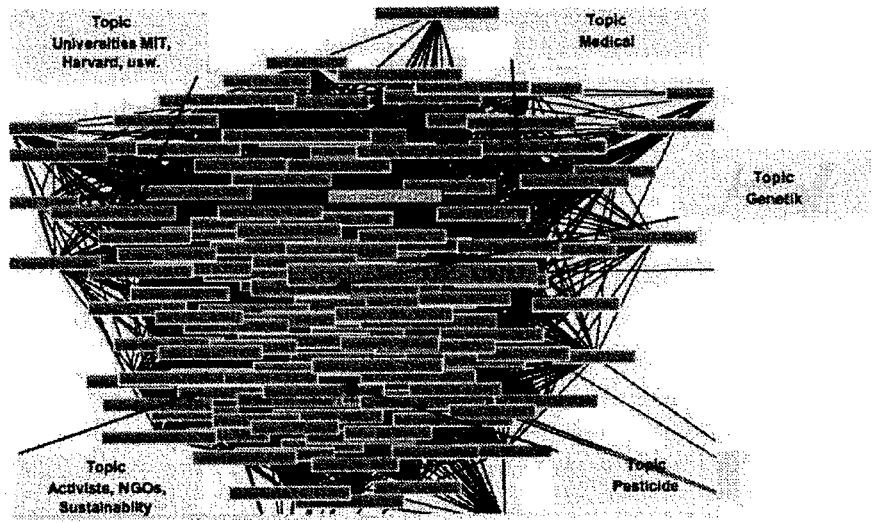
Figure 7:
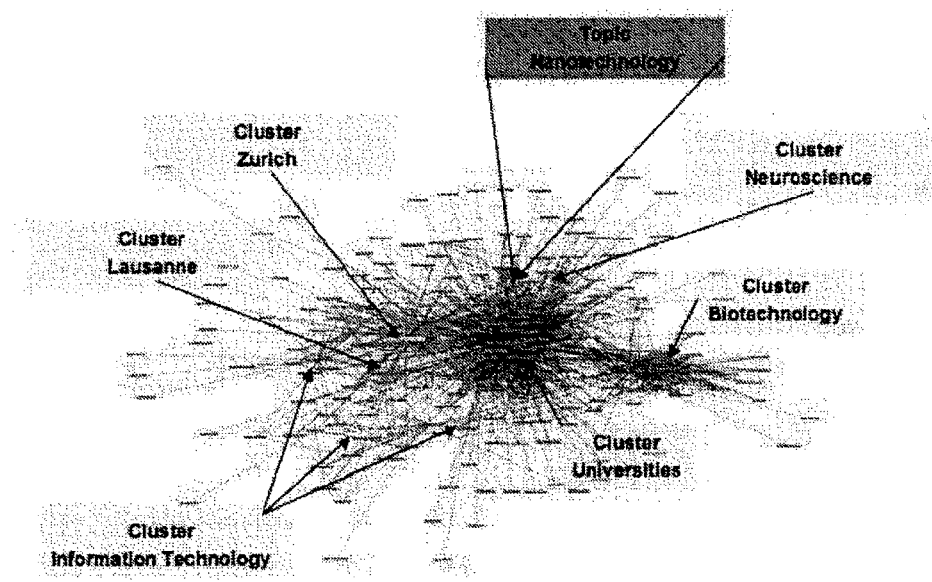
Figure 8:
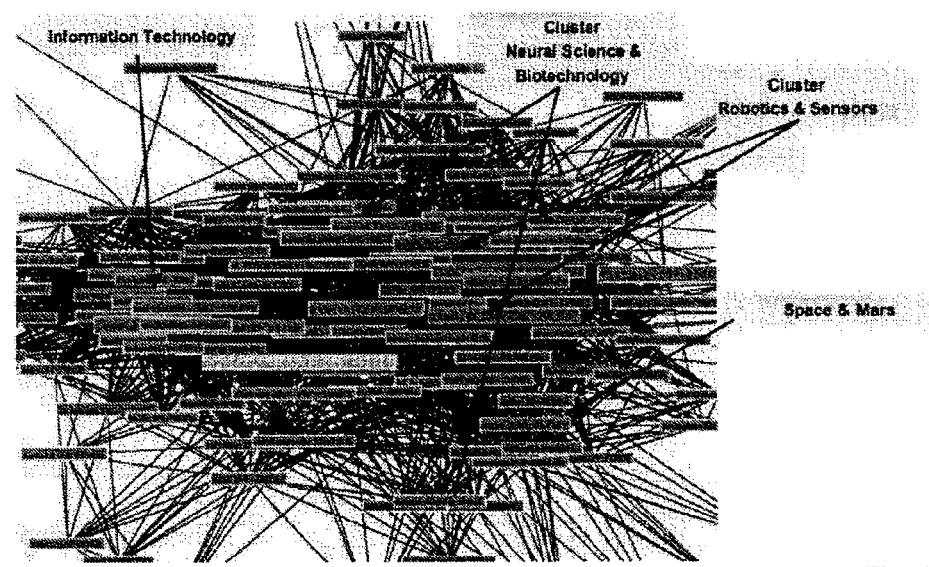
Figure 9:
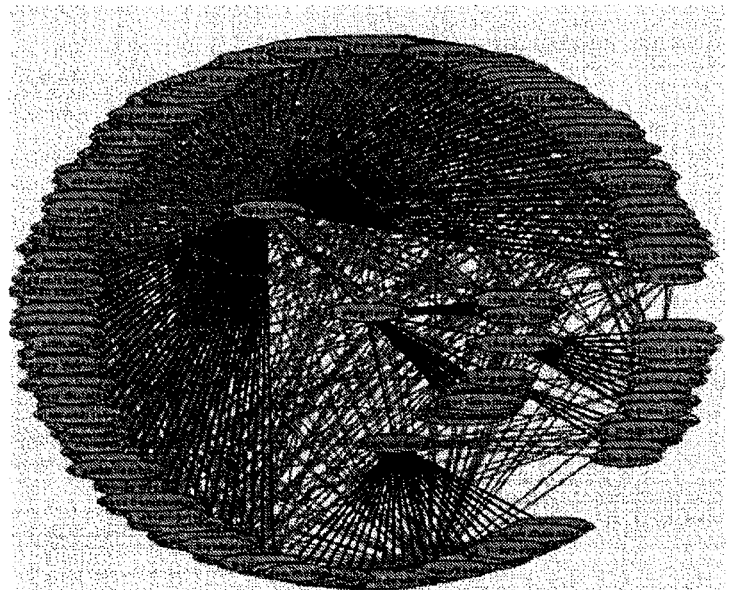
Figure 10:
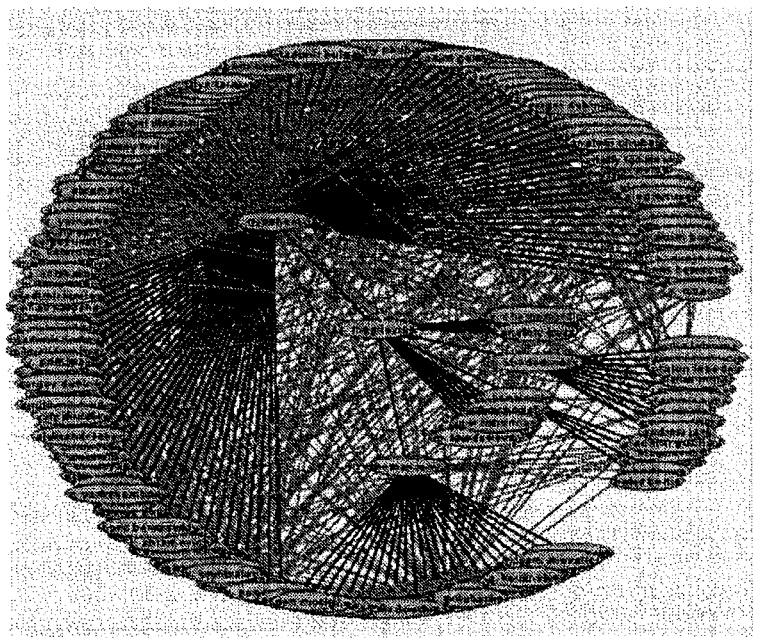
Figure 11:
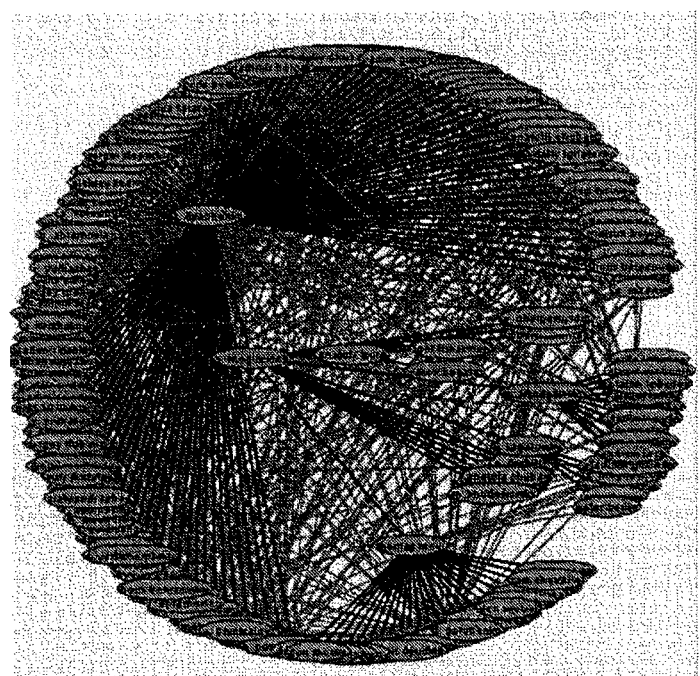
Figure 12:
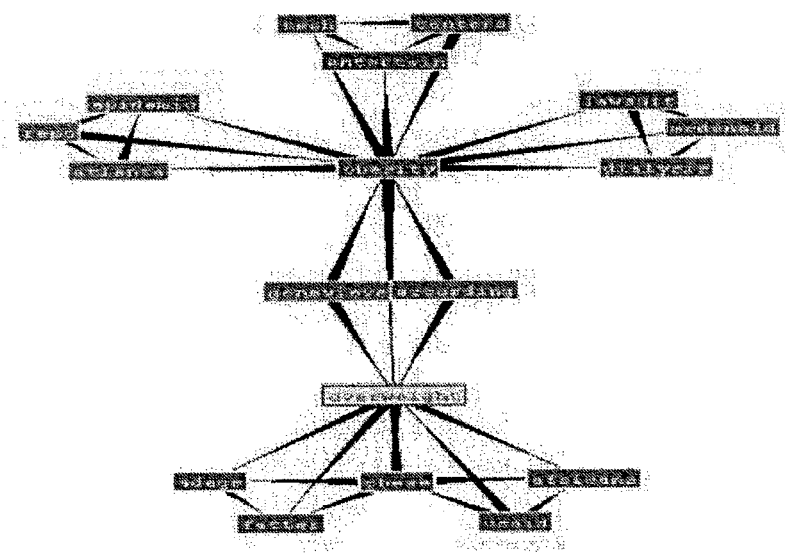

At this point it is of importance to understand that the term "search engine" is normally used for various types of search engine in the prior art. The available search engines can be roughly subdivided into four categories: robots/crawlers, metacrawlers, search catalogues with search capabilities and catalogues or link collections. FIG. 1 shows the operation of robots/crawlers. Search robots or crawlers are distinguished by a process (i.e. the crawler) which moves through the network 70, in this case the Internet 701-704, from network node 73 to network node 73, or, respectively, from web site 73 to web site 73 (arrow 71) and in doing so sends the content of each web document which it finds back to its host computer 72. The host computer 72 indexes the web documents 722 sent by the crawler and stores the information in a database 721. Each search request by a user accesses the information in the database 721. The crawlers of the prior art normally consider each information item as relevant which is why any web documents found are indexed by the host computer 72. Examples of such robots/crawlers are, among others, Google™, AltaVista™ and Hotbot™. FIG. 2 illustrates the so called metacrawlers. Metacrawlers differ from the robots/crawlers by the capability of searching by means of a single search device 82, the answer being additionally generated by a multiplicity of other systems 77 of the network 75. The metacrawler is thus used as a front end for a multiplicity of further systems 77. The response to a search request via a metacrawler is typically limited by the number of its further systems 77. Examples of metacrawlers are, among others, MetaCrawler™, LawCrawler™ and LawRunner™.

Catalogues with or without search capabilities are distinguished by a special selection of links which are manually structured and/or organized and stored in a corresponding database. In the case of a catalogue with search capabilities, the manually stored information is searched for the desired search terms by the system in the case of a search request. In the case of a catalogue without search capabilities, the user must himself look for the desired information in the list of stored links by, e.g. manually clicking or scrolling through the list. In the latter case, the user himself decides what information from the list appears relevant to him and which appears less relevant to him. Naturally, catalogues are limited by the performance volume and the priorities of the editor(s). Examples of such catalogues are, among others, Yahoo!™ and FindLaw™. Catalogues fall under the category of portals and/or vortals. Portals and, up to a certain extent, e.g., also proprietary databases such as FindLaw.com™ or WestLaw.com™ attempt to solve the problem in different ways. Portals attempt to obtain an overview of selected computer sites manually by allowing editors to "surf" the Internet, i.e. assess the content and to compile relevant data sources or sites. On average, the editors can search, read and evaluate about 10-25 sites per day, in which context, however, just one or two sites of 25 in most cases contain documents with the desired quality or information. It is clear that portals are very inefficient with respect to time, cost and work expenditure for the provider if the aim of a portal is intended to be a comprehensive indexing of all available data with respect to one subject in the Internet. For this reason, it is in most cases such that Internet portals also only specify links to the start/main pages of the various sites. Since the data offered in the Internet are subject to quick dynamics, it can even be said that a complete and current registration of all available data will scarcely ever be possible with this method. Vertical portals, so-called vortals, are understood to be generally portals which restrict their offer/selection of information to a particular field. Vortals therefore intrinsically have the same disadvantages as the portals discussed above. On the contrary, the said disadvantages are even more eminent in the case of vortals since due to their restriction of subject, the claim for quality and accuracy of the indexing is much higher. This makes the task of searching, reading and assessing a critical amount of information even more difficult and even more time consuming. An example of such a vortal is, among other things, FindLaw.com™ which has been offered and developed since 1995.

The search engines of the prior art in most cases consist of a crawler and an input capability (front end query) for a user. Search engines typically also comprise a database with stored links to various web documents or sites. The crawler selects a link, downloads the document and stores it in a data memory. After that, it selects the next link and also loads the document into the data memory etc. An indexing module reads one of the stored documents from the data memory and analyzes its content (e.g. on a word basis). If the indexing module finds further links in the document, it stores them in the database of the crawler so that the crawler can later also load the corresponding documents into the data memory. It depends on the respective search engine how the content of the document is indexed. The indexed information can be stored for later use, e.g. in a hash table or in another suitable tool. A user can then input a search request via the front end and the search engine looks for the corresponding indexed pages. The method is based on the "everything is relevant" principle which means that the crawler will fetch and store every web document which is accessible in any way. Complex, content-oriented enquiries cannot be carried out with today's search engines without them either excluding relevant documents or also specifying a flood of documents irrelevant to the enquiry. It is especially in the case of search enquiries in which subjects are to be indexed on the basis of parameters which are unrelated to the subject and cannot be precisely captured, that the search engines scarcely produce even approximately satisfactory answers. As mentioned, the problem of eminent importance to industry that general mood tendencies, opinion tendencies or mood fluctuations of the users of the network are to be registered with respect to an actual subject can be mentioned as an example in this respect. This cannot be carried out on the basis of current search engines. Similarly, it has not been possible in any way until now to detect moods and mood fluctuations of the network users with respect to a subject early and to specify the corresponding documents with the search engines of the prior art.

US patent application U.S.2003/0195872 discloses a system which can be used for connecting search terms with emotional weighting terms and to carry out a search in the Internet and/or Intranet on the basis of this association of search terms and emotional weighting terms. However, the system does not allow a selective screening of databases. In particular, it is not possible to provide any temporal information by means of the system. This prevents or renders impossible an objective assessment of tendencies or events to be expected. The system only allows a static listing of documents stored in the available databases. Thus, all relevant documents must still be read and interpreted more or less completely after the listing in this system which renders impossible an automatization in the sense of, e.g. a dynamic warning system. A further example from the prior art with respect to weighting the relevance of documents can be, e.g. US patent application U.S. 2005/0198070A1. In this application, it is attempted to solve the problem of relevance indexing by forming corresponding topical tokens. Here, too, however, the documents are subsequently displayed to the user by means of simple listing.

A further problem of many acquisition systems is the language problem as already mentioned in part. International Patent Application WO 03/065248 A2 presents a system which attempts to solve the language problem by means of a multi-language index. In this arrangement, documents can be searched, or correspondingly weighted in parallel in accordance with languages. Finally, US patent application US2005/0102270A1 discloses a system which, in addition to indexing, attempts to arrange the documents by means of a tabling on the basis of hierarchical index parameters (index, subindex etc.) for the user in such a manner that, in the case of a multiplicity of documents found, he obtains a topically arranged access to the documents. However, arranging the documents purely in table form cannot provide the user with any information how the subject fields are linked with one another and how they behave with respect to their relevance with respect to one another. In the case of a large quantity of documents found, the user is lost similarly to the usual conventional relevance listing. It is an object of the present invention to propose a new system and a method for user-controlled multi-dimensional navigation and/or subject-based aggregation of multimedia data which do not have the above-mentioned disadvantages of the prior art. In particular, an automated, simple and rational system and method for carrying out complex, content-oriented enquiries are to be proposed. In the enquiry, in particular, parameters which are unrelated to the subject and/or are not precisely comprehensible such as, e.g. moods or mood fluctuations of the network users should be possible as filter parameters. Conversely, it should also be possible with the method and system according to the invention to detect moods and mood fluctuations of the network users with respect to a subject early and to specify the corresponding documents. Furthermore, it should be possible for the user to register the multiplicity of documents rapidly and effectively in accordance with subject fields and relevance with respect to one another and to be able to evaluate them correspondingly. In this context, the system should be able to dynamically detect and use new fields. According to the present invention, this aim is achieved, in particular, by the elements of the independent claims. Further advantageous embodiments are also apparent in the dependent claims and the description. In particular, these aims are achieved by the invention in that for user-controlled multi-dimensional navigation and/or subject-based aggregation of multimedia data, a multiplicity of node elements are generated and/or extracted out of multimedia data to be registered, a node element comprising one or more extracted and/or generated search terms and/or weighting terms which can be logically combined, in that a relevance index parameter is determined for each multimedia data element to be registered by means of the system for each paired combination of node elements and is allocated to the respective pair of node elements, in that, in dependence on the relevance index parameters, one- or multi-dimensional distance factors are determined, the absolute value of the corresponding distance factor becoming smaller with increasing relevance of two paired multimedia data elements with respect to one another, in that, on the basis of the registered multimedia data elements and/or node elements, a topological navigation map is generated and graphically displayed in dependence on the respective one- or multi-dimensional distance factors, and in that the user navigates in the topological navigation map by means of input device and accesses desired multimedia data elements and/or node elements. The relevance index parameters can be determined, e.g. in accordance with the frequency of the search terms and/or weighting terms in a combination of node element pairs or the corresponding multimedia data, respectively. The user can navigate by means of selection, e.g. by means of topographic input element, between node elements and/or multimedia data elements and/or produced clusters of node elements and/or multimedia data elements. The topographical input device can comprise, e.g. at least one graphical, two-dimensional input element. The invention has the advantage, among other things, that the user obtains the registered data accessibly and logically structured in a completely new way. This is provided, in particular, without him having to predetermine the arrangement himself or otherwise having to intervene in the process. Furthermore, he can topologically navigate between the individual logical subject fields in a completely new and intuitive way and access the corresponding objects and/or data. The navigation system by means of the clusters and connections according to the invention allows an efficient access to such large volumes of data without the user becoming lost in the volume of data.

In a variant of the embodiment, following the user-specific selection of an initiating node element and/or multimedia data element, the topological navigation map is corrected in perspective with respect to this initiating node element and/or multimedia data element and displayed accessible to the user. For the navigation in the topological navigation map, the user can select desired node elements and/or multimedia data elements by means of the input device and correct in perspective and newly display the topological navigation map on the basis of the selection by means of the system. This variant of the embodiment has the advantage that the user can move completely intuitively like in a landscape between the data clusters via the input device and can obtain corresponding data. The node element, on the basis of which the system generates the first display of the navigation map, can be effected, e.g. by means of selection of one or several search terms by the user and/or otherwise user-specifically. This has the advantage, among other things, that the user can start rapidly and at the desired location in the topological navigation map and is rapidly provided with the navigation map.

In another variant of the embodiment, the distance factors will be determined by means of a spring model module and/or by means of a maximum entropy module. This has the advantage, among other things, that the data are made accessible to the user in a completely new way, particularly graphically. In the navigation by means of input device by the user within the navigation map, the distances when navigating in the data also correspond to the relevance of the data or data clusters with respect to one another. The relevance index parameters and/or distance factors can be generated and/or determined, e.g. dynamically on the basis of the selection of a node element and/or multimedia data element by means of the system.

In another variant of the embodiment, one or more search terms, which can be logically combined, are stored in a data memory for aggregation and monitoring and/or analysis of the multimedia data stored decentralized, a computing unit accessing network nodes connected to source databases via a network and data of the source databases being selected on the basis of the search terms, in a data memory, at least one weighting parameter being stored allocated to a search term and/or a logical combination of search terms, at least one of the source databases being stored allocated to a search term and/or a logical combination of search terms in the data memory, by means of a filter module of the computing unit, the source databases of the network nodes being accessed, a weighting list with found data records being generated for each weighting parameter in conjunction with the associated search terms and the associated source databases and/or a temporal weighting of documents, by means of a parameterizing module, one or more variable mood variables being generated at least partially dynamically on the basis of the weighting list for the respective weighting parameter, which variable mood variables correspond to temporal, positive and/or negative mood fluctuations of users of the network, the extracted search terms and/or weighting terms and/or node elements comprising at least the mood variables. Naturally, e.g. mood variables can also determine the spring constants in the spring model module and the relevance index parameters can determine the force or conversely. The computing unit can comprise an HTML (Hyper Text Markup Language) and/or HDML (Handheld Device Markup Language) and/or WML (Wireless Markup Language) and/or VRML (Virtual Reality Modeling Language) and/or ASP (Active Server Pages) module, e.g. for generating the variable mood variables and/or the data of the content module. This variant of the embodiment has the advantage, among other things, that the system is based on a totality of sources from a network, particularly from the Internet (e.g. websites, chat rooms, e-mail fora etc.) which can be specifically defined in advance, which are also scanned in accordance with search criteria which can be defined in advance. Thus, the system provides not only for the generation of a "hitlist" of websites found in the Internet with corresponding content but the system provides for the above-mentioned screening of predefinable sources and their systematic, and thus quantitatively relevant evaluation in accordance with the desired and defined content criteria (e.g. which medicaments are mentioned in conjunction with severe side effects—and those in what frequency). This content screening can take place in a periodic sequence (temporally), where all "hit" contents found can be made available again at any time and thus statistical statements are possible, especially over time. Naturally, the documents can also be registered in other ways for their temporal correlation, e.g. on the basis of the storage date. Thus, the system also detects when which content was stored in the said sources. Due to the fact that a quantitative evaluation becomes possible in this way, the system can independently 'monitor' the defined sources and (quantitatively) correspondingly display a transgression of a 'threshold value'. The system makes it possible to define search criteria in such a manner that it is possible to search for logical relationship in the content (producing a sense) (it is not only the keyword which counts but content relationship). The system thus links the search criteria with a content for which a search is then conducted.

In one variant of the embodiment, one or more of the weighting parameters are generated by means of a lexicographical weighting database. The same can be implemented for the search terms. This variant of the embodiment has the advantage, among other things, that search and weighting terms can be defined user-specifically and/or application-specifically. As a variant of the embodiment, the lexicographical weighting database and/or search term database can be supplemented and/or altered dynamically on the basis of searches/analyses already performed. The system can thus be adapted automatically to changed conditions and/or word formations which was not possible in this way in the prior art.

In another variant of the embodiment, one or more of the weighting parameters are generated dynamically by means of the computing unit during the generation of the weighting list. This variant of the embodiment has the same advantages, among other things, as the preceding variant of the embodiment.

In another variant of the embodiment, the weighting list with the data records found and/or references to the data records found is stored accessible to a user in a content module of the computing unit. This variant of the embodiment has the advantage, among other things, that the system can be used, e.g. as warning system for the user which informs and/or warns him about impending trends in the market or the population (e.g. class actions etc.).

In one variant of the embodiment, the mood variables are periodically checked by means of the computing unit and if at least one of the mood variables is outside a determinable fluctuation tolerance or a determinable expected value, the corresponding weighting list with the data records found and/or references to data records found is stored accessible to a user and/or updated in the content module of the computing unit. This variant of the embodiment has the advantage, among other things, that the databases can be selectively scanned for temporal changes or events to be expected, e.g. by means of definable probability threshold value, and can thus warn the user, e.g. in time (e.g. product errors, product liability etc.).

In yet another variant of the embodiment, a user profile is created by means of user information, user-specifically optimized data being generated on the basis of found data records and stored in the content module and/or references to found data records by means of a repackaging module, taking into consideration the data of the user profile, which user-specifically optimized data are provided to the user stored in the content module of the computing unit. As a variant of the embodiment, various user profiles for different communication devices of the user can be stored allocated to the user. Furthermore, e.g., data relating to the user behavior can also be automatically registered by the computing unit and stored allocated to the user profile. This variant of the embodiment has the advantage, among other things, that the different access possibilities of the user can be taken into consideration user-specifically and the system can thus be optimized user-specifically.

In one variant of the embodiment, by means of a history module, for each calculated variable mood variable, the values up to a predeterminable past time are stored. This variant of the embodiment has the same advantages, among other things, as a time control and registration of changes within the stored and accessible documents.

In a further variant of the embodiment, the computing unit calculates by means of an extrapolation module expected values for a determinable mood variable on the basis of the data of the history module for a determinable future time and stores them in a data memory of the computing unit. This variant of the embodiment has the advantage, among other things, that events to be expected can be predicted in an automated manner. This may be appropriate not only in the case of warning systems (e.g. against class actions in the case of product liability etc.) but quite generally in systems in which a statistically temporal extrapolation is of importance as in risk management system at the stock exchange or financial markets etc.

At this point, it should be noted that the present invention relates, apart from the method according to the invention, also to a system for carrying out this method. Furthermore it is not restricted to the said system and method but is also related to a non-transitory computer program product (i.e, a non-transitory computer program readable medium) for implementing the method according to the invention.

In the text which follows, variants of the embodiment of the present invention will be described with reference to examples. The examples of the embodiments are illustrated via the following attached figures:

FIGS. 1 to 12 diagrammatically show the operation of an example of navigation maps according to the invention. The different distances within the topological navigation map are based on the paired relevance of the subject fields and offer the user the basis for navigating and/or registering the documents. The system dynamically changes the navigation map on the basis of the selection by the user by means of input device.

Figure 13:
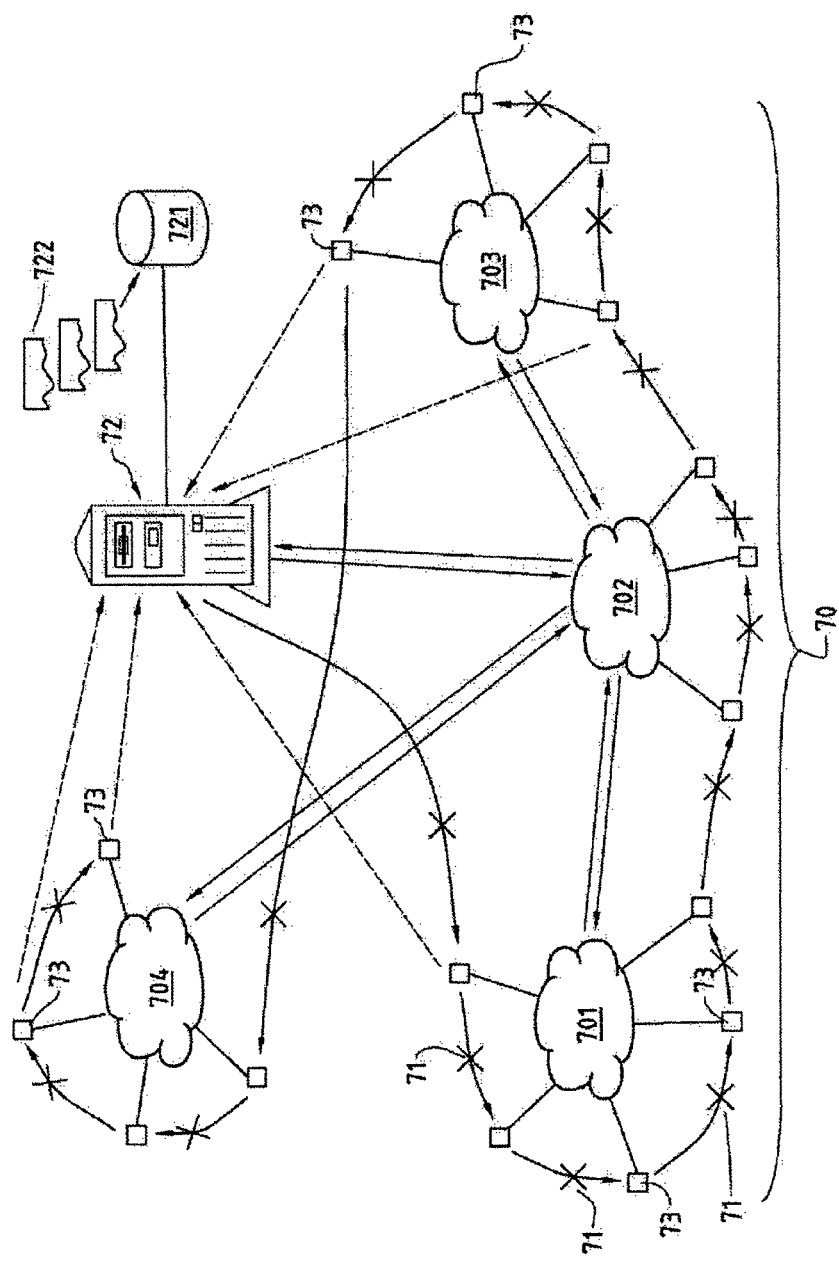

FIG. 13 diagrammatically shows the operation of robots/crawlers, search robots or crawlers. The crawler moves through the network 70, in this case the Internet 701-704, from network node 73 to network node 73 or, respectively, from website 73 to website 73 (arrow 71) and in doing so sends the content of each web document found by it back to its host computer 72. The host computer 72 indexes the web documents 722 sent by the crawler and stores the information in a database 721. Each search request by a user accesses the information of the database 721.

Figure 14:
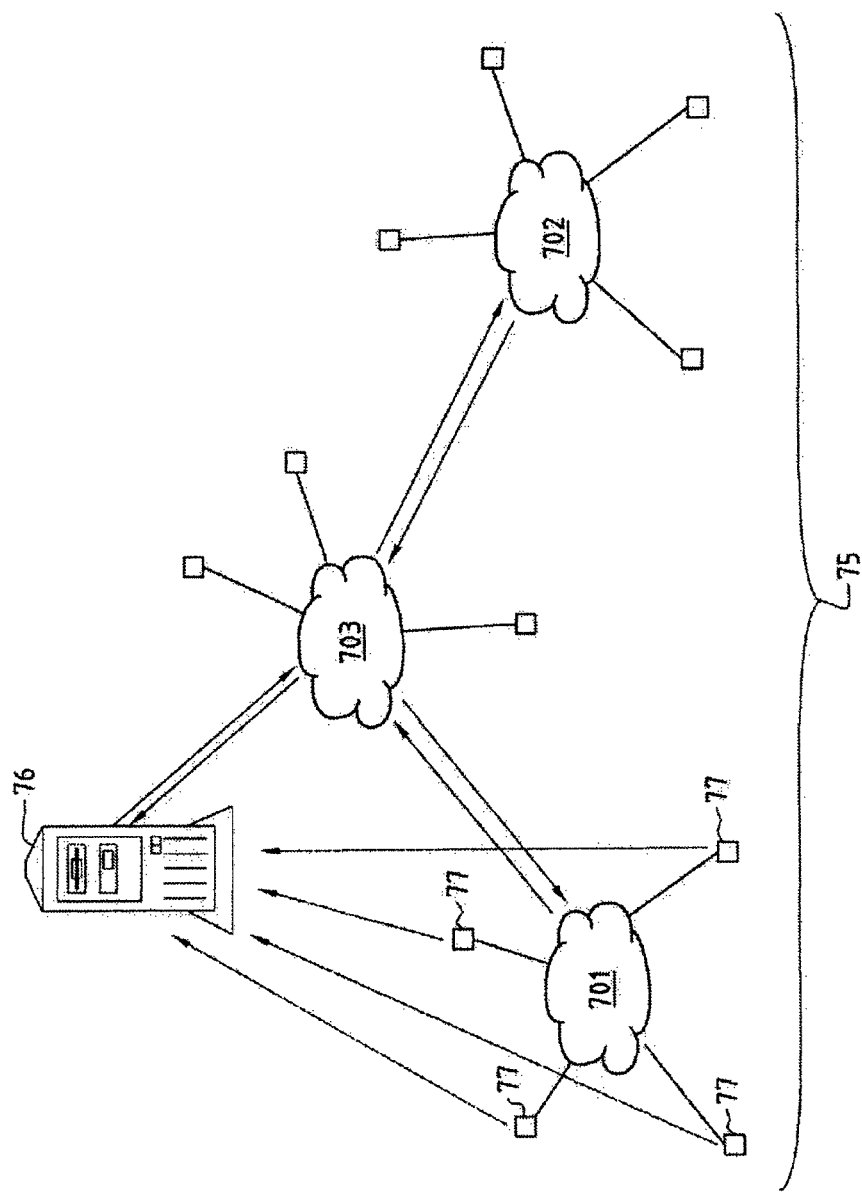

FIG. 14 diagrammatically illustrates the operation of metacrawlers. Metacrawlers provide the possibility of searching by means of a single search device 82, the answer being additionally generated by a multiplicity of further systems 77 of the network 75. The metacrawler is thus used as a front end for a multiplicity of further systems 77. The answer to a search request via a metacrawler is typically limited by the number of its further systems 77.

Figure 15:
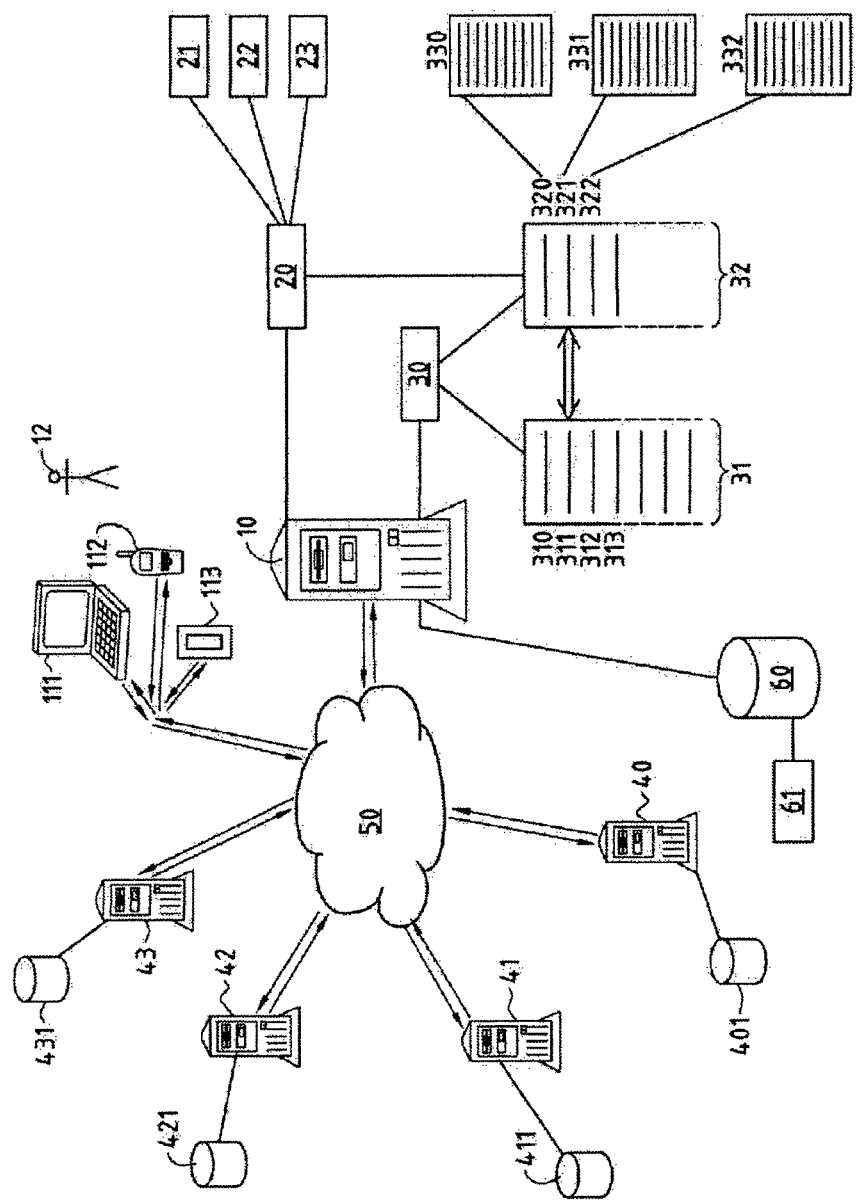

FIG. 15 shows a block diagram which diagrammatically reproduces a system or a method for aggregation and analysis of multimedia data stored decentralized. In a data memory 31, one or several search terms 310, 311, 312, 313, which can be logically combined, are stored. A computing unit 10 accesses via a network 50 network nodes 40, 41, 42, 43 connected to source databases 401, 411, 421, 431 and data of the source databases 401, 411, 421, 431 are selected on the basis of the search terms 310, 311, 312, 313.

FIGS. 1 to 12 diagrammatically illustrate different navigation maps which can be used for implementing the invention. In this exemplary embodiment, a multiplicity of node elements 1 are generated and/or extracted out of multimedia data to be registered for the user-controlled multi-dimensional navigation and/or subject-based aggregation of multimedia data. A node element 1 comprises one or more extracted and/or generated search terms and/or weighting terms which can be logically combined. For each multimedia data element to be registered by means of the system, a relevance index parameter is determined for each paired combination of node elements and allocated to the respective pair of node elements. Relevance or the relevance factors, respectively, can comprise, e.g. frequency of the search terms and/or weighting terms, their direct or indirect vicinity to one another etc. in one or more documents. Other methods, known in the prior art, for determining the relevance of a document with respect to other documents are also conceivable. Such methods are known in many variations, e.g. from the familiar search engines such as AltaVista, Google etc. Depending on the relevance index parameters, one- or multi-dimensional distance factors are determined, the absolute value of the corresponding distance factor becoming smaller with increasing relevance of two paired multimedia data elements with respect to one another. On the basis of the registered multimedia data elements and/or node elements in dependence on the respective one- or multi-dimensional distance factors, a topological navigation map is generated and graphically displayed. The topological navigation map can be displayed 1-, 2-, or 3-dimensionally for the user. Naturally, higher dimensions are also possible but require a corresponding display as can be found several times in the prior art for displaying multi-dimensional structures. The user navigates in the topological navigation map 4 by means of input device and accesses desired multimedia data elements and/or node elements 1. The user can navigate, e.g., by means of topographic input element between node elements 1 and/or multimedia data elements and/or produced clusters 2 of node elements 1 and/or multimedia data elements by means of selection. Following user-specific selection of an initiating node element 5 and/or multimedia data element, the topological navigation map 4 can be corrected in perspective with respect to this initiating node element 5 and/or multimedia data element and displayed accessible to the user. "Initiating" is understood to be "initial", in the sense of "displayed for the first time" in the present application. Thus, the system, after a special registration of the multimedia data or when defining new weighting and/or search terms, must somehow select a corresponding starting point for displaying the navigation map. This starting point is that of an initiating node element 5 and/or multimedia data element. For the navigation by the user in the topological navigation map, the user can select desired node elements 1 and/or multimedia data elements by means of the input device, the topological navigation map 4 being corrected in perspective and newly displayed on the basis of the selection by means of the system. This allows dynamic navigating within the topological navigation map. The user can thus visually control and check the display and the registration or accessing of data by means of the topological input device. The topographic input device can comprise at least one graphical, two-dimensional input element. This can comprise, e.g. also a coordinate input device such as, e.g. a mouse, trackball, eye tracker etc. Naturally, other topological input devices are also conceivable without impinging on the protective range of the invention.

The distance factors can be determined, e.g. by means of a spring model module. This form of "elastic" navigation map is determined by a spring model determination of the distance factors. Two adjacent node elements are logically combined as points by springs which are tensioned with a relative displacement of relevance index parameters. In a displayed navigation map, spring constants can be allocated to each pair of node elements $k_1$, $k_2$, $k_3$ etc. in accordance with the relevance index parameters and/or force parameters based on the relevance index parameter. Within the navigation map, the node elements behave with respect to one another in accordance with the known rules of Hook's law. The tension or the distance factors, respectively, can be proportional to relevance, i.e. the force or the selected spring constants. For the navigation, the node elements can be appropriately corrected in perspective for the user in the navigation map. However, the distance factors can also be determined, e.g. by means of a maximum entropy module as in neuro networks. In this case, the distance factors are based, e.g. on the thickness of the resultant synaptic connections between the neurons (correspondingly here: node elements).

Other modules such as, e.g. modules based on the Markov model can also be appropriate. The relevance index parameters and/or distance factors can be generated and/or determined, e.g. dynamically by means of the system on the basis of the selection of a node element 1 and/or multimedia data element. The user can thus obtain a dynamic representation of the navigation map for navigation by means of the input device which may facilitate his orientation. For the initial display, the node element 1, on the basis of which the first display of the navigation map 4 is generated, takes place by means of selection of one or several search terms by the user and/or otherwise user-specifically.

For the aggregation and analysis of the multimedia data stored decentralized in the data memory 31, one or more search terms 310, 311, 312, 313 which can be logically combined can be stored. Multimedia data are understood to be, among others, digital data like texts, graphics, images, maps, animations, moving pictures, video, QuickTime, sound recordings, programs (software), program-associated data and hyperlinks or references to multimedia data. This also includes, e.g. MPx (MP3) or MPEGx (MPEG4 or 7) standards as defined by the Moving Picture Experts Group. In particular, the multimedia data can comprise data in the HTML (Hyper Text Markup Language), HDML (Handheld Device Markup Language), WMD (Wireless Markup Language), VRML (Virtual Reality Modeling Language) or XML (Extensible Markup Language) format. A computing unit 10 accesses via a network 50 network nodes 40, 41, 42, 43 connected to source databases 401, 411, 421, 431 and data of the source databases 401, 411, 421, 431 are selected on the basis of the search terms 310, 311, 312, 313. According to the present invention, the computing unit 10 is connected bidirectionally to the network nodes 40, 41, 42, 43 via a communication network. The communication network 50 comprises, for example, a GSM or a UMTS network or a satellite-based mobile radio network and/or one or more fixed networks such as, for example, the public switched telephone network, the worldwide Internet or a suitable LAN (Local Area Network) or WAN (Wide Area Network). In particular, it also comprises ISDN and XDSL connections. As shown, the multimedia data can be stored at different locations in different networks or locally accessible to the computing unit 10. The network nodes 40, 41, 42, 43 can comprise WWW servers (HTTP: Hyper Text Transfer Protocol/WAP: Wireless Application Protocol etc.), chat servers, e-mail servers (MIME), news servers, E-Journal servers, group servers or any other file servers such as, e.g. FTP (File Transfer Protocol) servers, ASD (Active Server Pages) based servers or SQL (Structured Query Language) based servers etc.

In a data memory 32 of the computing unit 10, at least one weighting parameter 320, 321, 322 is allocated to a search term 310, 311, 312, 313 and/or a logical combination of search terms 310, 311, 312, 313 and stored. The search term 310, 311, 312, 313 and/or a logical combination of search terms 310, 311, 312, 313 comprises the actual search term. To return to the example of the Fiat Uno mentioned, the search term 310, 311, 312, 313 and/or a logic combination of search terms 310, 311, 312, 313 would be, in consequence, e.g. Fiat, Fiat Uno, Fiat AND/OR Uno FIAT etc. In contrast, the weighting parameters 320, 321, 322 comprise the weighting subject, e.g. class action, court case etc. with corresponding weighting attributes. The weighting attributes can be specific to a weighting subject, e.g. damage, liability, insurance sum or quite generally weighting judgments such as "good", "poor", "angry", etc., i.e., e.g. comprise psychological or emotional attributes or words which allow such an association. It is important to point out that the weighting parameters 320, 321, 322 can also comprise restrictions with regard to the network 50 and/or specific network nodes 40-43. As an example, it is thus possible to restrict the aggregation and analysis of the multimedia data, for example to certain news groups and/or websites by means of corresponding weighting parameters 320, 321, 322. In the present exemplary embodiment, one or more of the weighting parameters 320, 321, 322 can be generated by means of a lexicographic or other weighting database. Similarly, it may be appropriate that the or several weighting parameter(s) 320, 321, 322 are generated at least partially dynamically by means of the computing unit 10 during the generation of the weighting list 330, 331, 332. Dynamic can mean, e.g., that the parameterization module 20 or the filter module 30 associably checks the multimedia data and/or the data of the weighting list 330, 331, 332 in accordance with a weighting parameter 320, 321, 322 during the indexing and/or at a later point in the method, and adds these to the weighting parameters 320, 321, 322. In this case, it may be appropriate that the weighting parameters 320, 321, 322 can be edited by the user 12. In the dynamic generation, in particular, analysis modules based on neuro network algorithms, e.g. may be appropriate.

In the data memory 32, at least one of the source databases 401, 411, 421, 431 can be stored allocated to a search term 310, 311, 312, 313 and/or a logical combination of search terms 310, 311, 312, 313. The allocation can comprise not only explicit network addresses and/or references of databases but also categories and/or groups of databases such as, e.g., websites, chat rooms, e-mail fora etc.). The allocation can be implemented automated, partially automated, manually and/or based on a user profile and/or other user-specific and/or application-specific data. The computing unit 10 accesses the source databases 401, 411, 421, 431 of the network nodes 40, 41, 42, 43 by means of a filter module 30 and generates for each weighting parameter 320, 321, 322, in conjunction with the associated search terms 310, 311, 312, 313 and/or source databases 401, 411, 421, 431, a weighting list 330, 331, 332 with data records found. It is obvious to the expert that the weighting subject does not necessarily need to be treated at equal level as the weighting attributes during the indexing. To generate the weighting list 330, 331, 332, on the basis of the multimedia data, e.g. metadata based on the content of the multimedia data can be generated or aggregated by a metadata extraction module of the computing unit 10. I.e. the weighting list 330, 331, 332 can thus comprise such metadata. The metadata or quite generally the data of the weighting list 330, 331, 332 can be extracted, e.g. by means of a content-based indexing technique and can comprise key words, synonyms, references to multimedia data (e.g. also hyperlinks), image and/or sound sequences etc. Such systems are known in the prior art in their most varied variations. Example of these are U.S. Pat. No. 5,414,644 which describes a three-file indexing technique or U.S. Pat. No. 5,210,868 which during the indexing of the multimedia data and extracting of the metadata additionally also stores synonyms as search key words. However, in the present exemplary embodiment, the metadata can also be generated at least partially dynamically (in real time) on the basis of user data of a user profile. This has the advantage, e.g. that the metadata always have the topicality and accuracy which is meaningful for the user 12. From the user behavior at the communication device 111, 112, 113 to the metadata extraction module, a type of feedback capability thus exists which can influence the extraction directly. However, so-called agents can also be used, particularly in the search for particular data.

The said user profile can be created, e.g. by means of user information and stored allocated to the user 12 in the computing unit 10. The user profile remains either permanently stored allocated to a particular user 12 or is created temporarily. The communication device 11/112/113 of the user can be, for example, a PC (personal computer), TV, PDA (Personal Digital Assistant) or a mobile radio device (particularly, e.g. in combination with a broadcast receiver). The user profile can comprise information about a user such as, e.g. location of the communication unit 111/112/113 of the user in the network, identity of the user, user-specific network characteristics, user-specific hardware characteristics, data relating to the user behavior etc. The user 12 can specify and/or modify at least parts of user data of the user profile in advance of a search request. Naturally, the user 12 always has the possibility of searching for multimedia data by direct access, that is to say without search and compilation aid by the computing unit 10 in the network and accessing the data. The remaining data of the user profile can be determined automatically by the computing unit 10, or authorized third parties or also by the user. Thus, the computing unit 10 can comprise, e.g. automatic on-line verification, user identification and/or automatic recording and evaluating of the user behavior (time of the access, frequency of the access etc.). These data relating to the user behavior can then be again modifiable by the user in accordance with his wishes in one variant of the embodiment.

By means of a parameterizing module 20, one or more variable mood variables 21 are generated at least partially dynamically on the basis of the weighting list 330, 331, 332 for the respective weighting parameter 320, 321, 322. The extracted and/or generated search terms and/or weighting terms and/or node elements can comprise at least the mood variables 21. Naturally, the mood variables can also determine, e.g. the spring constants in the spring model module and the relevance, the force, or conversely. To generate the variable mood variables 21 and/or the data of the content module 60, HTML and/or HDML and/or WML and/or VRML and/or ASD can be used, for example. The variable mood variable 21 corresponds to positive and/or negative mood fluctuations of users of the network 50. The variable mood variable 21 can also be specific of a weighting subject. E.g., the variable mood variable 21 can reproduce the probability of a class action against a certain company and/or a certain product or merely a general usefulness grading by the users, e.g. in the case of a medicament, or of a specific subgroup such as doctors and/or other medical technical personnel. As an example of the embodiment, the weighting list 330, 331, 332 can be stored with the data records found and/or references to data records found in a content module 60 of the computing unit 10 accessible to a user. In order to be able to access the content module 60, it may be appropriate (e.g. for accounting for the service claimed) to identify a particular user 12 of the computing unit 10 by means of a user database. For the identification, e.g. personal identification numbers (PIN) and/or so-called smartcards can be used. In the normal case, smartcards assume the existence of a card reader in the communication device 111/112/113.

In both cases, the name or another identification of the user 12 and the PIN are conveyed to the computing unit 10 or to a trusted remote server. An identification module or authentication module decodes (if necessary) and checks the PIN via the user database. As a variant of the embodiment credit cards can also be used for identifying the user 12. If the user 12 uses his credit card, he can also input his PIN. The magnetic strip of the credit card typically contains the account number and the encrypted PIN of the authorized owner, i.e. in this case of the user 12. Decryption can take place directly in the card reader itself as is normal in the prior art. Smartcards have the advantage that they allow greater security against fraud by additional encryption of the PIN. This encryption can be carried out either by a dynamic numerical key which contains, e.g. time, day or month, or another algorithm. The decryption and identification is not done in the device itself but externally via the identification module. A chip card introduced directly into the communication device 111/112/113 provides another possibility. The chip card can be, e.g. SIM (Subscriber Identification Module) cards or smartcards, the chip cards in each case being allocated a directory number. The allocation can be done, e.g. via an HLR (Home Location Register) in that in the HLR, the IMSI (International Mobile Subscriber Identification) is stored allocated to a directory number, e.g. a MSISDN (Mobile Subscriber ISDN). Unambiguous identification of the user 12 is then possible via this allocation.

To start a search enquiry, a user 12 conveys, e.g. via a front end a search request for the corresponding enquiry from the communication device 111/112/113 via the network 50 to the computing unit. The search request data can be input via input elements of the communication device 111/112/113. The input elements can comprise, e.g. keyboards, graphic input means (mouse, trackball, eye tracker in the case of virtual retinal display (VRD) etc.) but also IVR (Interactive Voice Response) etc. The user 12 has the capability of determining at least a part of the search request data himself. This can be done, e.g. in that the user is requested by the receiving device 111/112/113 to fill out a corresponding front end query via an interface. The front end query can comprise, in particular, an additional authentication and/or fees for the enquiry. In the computing unit 10, the search request data are checked and if they satisfy determinable criteria, the search is carried out. To obtain the best possible topicality of the data or to achieve a permanent monitoring of the network, the mood variables 21, e.g., can be periodically checked by means of the computing unit 10 and if at least one of the mood variables 21 is outside a determinable fluctuation tolerance or a determinable expected value, the corresponding weighting list 330, 331, 332 can be stored and/or updated with the data records found and/or references to data records found in the content module 60 of the computing unit 10 accessible to a user. For user-specific requests, it may be appropriate that, e.g., a user profile is created by means of user information, user-specifically optimized data being generated, e.g. on the basis of the found data records stored in the content module 60 and/or references to found data records by means of a repackaging module 61, taking into consideration the data of the user profile. The user-specifically optimized data can then be provided, e.g., to the user 12 stored in the content module 60 of the computing unit 10. It may be advantageous that for a user 12, various user profiles for different communication devices 111, 112, 113 are stored allocated to this user 12. For the user profile, data relating to the user behavior can also be automatically registered, e.g., by the computing unit 10 and stored allocated to the user profile.

It is important to point out that, as a variant of the embodiment, for each calculated variable mood variable 21, the values can be stored up to a determinable past time by means of a history module 22. This allows that, e.g., the computing unit 10 calculates by means of an extrapolation module 23 expected values for a determinable mood variable 21 on the basis of the data of the history module 22 for a determinable future time and stores these values in a data memory of the computing unit 10. The user 12 can thus be informed not only about current mood fluctuations or mood changes but can also access expected values for future behavior of the users of the network and adjust himself correspondingly.

It is also of importance to mention that the topological navigation map, as topic map, already comprises information, i.e. results, also without being used further for navigation within the registered data—namely, e.g. which main subjects are located in the documents examined. Such automated subject evaluation is not known as such anywhere in the prior art. To generate a topological navigation map or topic map, e.g. n documents can be analyzed by means of the system and the relevant key words can be extracted as search terms and/or weighting terms. The relevance can be measured in the most varied ways, e.g. by picking out the search terms and/or weighting terms which occur over proportionally in the text relative to a large corpus with standard texts.

The invention claimed is:

1. A method for user controlled multi-dimensional navigation of multimedia data, comprising:
    generating or extracting a multiplicity of node elements out of multimedia data to be registered, a node element comprising one or more extracted search terms, generated search terms or weighting terms that can be logically combined;
    determining a relevance index parameter for each multimedia data element to be registered for each paired combination of node elements and that is allocated to the respective pair of node elements;
    determining, in dependence on the relevance index parameters, one- or multi-dimensional distance factors, the absolute value of the corresponding distance factor becoming smaller with increasing relevance of two paired multimedia data elements with respect to one another;
    generating and graphically displaying, on the basis of at least one of the registered multimedia data elements or node elements, a topological navigation map in dependence on the respective one- or multi-dimensional distance factors; and
    wherein
    the topological navigation map is navigable through use of an input device to permit user access to at least one of desired multimedia data elements and node elements, wherein following user-specific selection of at least one of an initiating node element and multimedia data element and produced clusters of node elements and multimedia data elements, the topological navigation map is corrected in a perspective of at least three-dimensions with respect to at least one of the initiating node element and multimedia data element and clusters, and displayed accessible to the user,
    the topological navigation map displays a dynamic and moveable at least three-dimensional perspective for user navigation therethrough in order to respond in real-time by displaying changes in the distance factors of the relevance index parameters indicative of changes in said relevance of two paired multimedia data elements with respect to one another.

2. The method as claimed in claim 1, wherein the user, by a topographic input device including at least one graphical, two-dimensional input element, navigates between at least one of node elements and multimedia data elements and produced clusters of node elements and multimedia data elements by selection.

3. The method as claimed in claim 1, wherein the distance factors are determined by a spring model module.

4. The method as claimed in claim 1, wherein the distance factors are determined by a maximum entropy module.

5. The method as claimed in claim 1, wherein at least one of the relevance index parameters or the distance factors are determined dynamically on the basis of the selection of a node element or multimedia data element.

6. The method as claimed in claim 1, wherein the node element, on the basis of which the first display of the navigation map is generated, takes place by selection of one or plural search terms by the user.

7. The method as claimed in claim 1, wherein relevance index parameters are determined in accordance with the frequency of the search terms in a paired combination of node elements.

8. The method as claimed in claim 1, wherein one or more search terms, which can be logically combined, are stored in a data memory, a computing unit accesses network nodes connected to source databases via a network, and data of the source databases are selected on the basis of the search terms,
in a data memory, at least one weighting parameter is stored and allocated to a search term or a logical combination of search terms,
wherein by a filter module of the computing unit, a multiplicity of source databases of the network nodes are accessed and a weighting list with found data records is generated for each weighting parameter in conjunction with the associated search terms, at least one or more of a source database type or a time information of the occurrence of the documents in this source database or location information of the source database is stored and allocated to each of the data records found, and
wherein, by a parameterizing module, one or more variable mood variables are generated at least partially dynamically on the basis of at least one or more of the weighting list, the associated source database types or the time information or location information for the respective weighting parameter, which variable mood variables correspond to temporal mood fluctuations of users of the network, the generated search terms or node elements comprising at least the mood variables.

9. The method as claimed in claim 8, wherein the weighting list with the data records found or references to data records found is stored accessible to a user in a content module of the computing unit.

10. The method as claimed in claim 9, wherein the mood variables are periodically checked by the computing unit and if at least one of the mood variables is outside a determinable fluctuation tolerance or a determinable expected value, the corresponding weighting list with the data records found or references to data records found is stored accessible to a user and updated in the content module of the computing unit.

11. The method as claimed in claim 9, wherein a user profile is created by at least one of user information, user-specifically optimized data being generated on the basis of found data records stored in the content module, or references to find data records by a repackaging module, taking into consideration the data of the user profile, which user-specifically optimized data are provided to the user stored in the content module of the computing unit.

12. The method as claimed in claim 11, wherein different user profiles for different communication devices of the user are stored allocated to the user.

13. The method as claimed in claim 11, wherein data relating to user behavior are automatically registered by the computing unit and stored allocated to the user profile.

14. The method as claimed in claim 8, wherein one or more of the weighting parameters are generated by a lexicographical weighting database.

15. The method as claimed in claim 8, wherein one or more of the weighting parameters are generated dynamically by the computing unit during generation of the weighting list.

16. The method as claimed in claim 8, wherein, for generating the variable mood variables, at least one of HTML, HDML, WML, VRML, or ASD is used.

17. The method as claimed in claim 8, wherein by a history module, for each calculated variable mood variable, the values up to a determinable past time are stored.

18. The method as claimed in claim 17, wherein the computing unit calculates by an extrapolation module expected values for a determinable mood variable on the basis of the data of the history module for a determinable future time and stores these values in a data memory of the computing unit.

19. The method as claimed in claim 8, wherein the source databases comprise at least one or more of different news groups or mail fora or WWW servers or chat servers or journal servers or subject boards or field-specific databases.

20. The method as claimed in claim 8, wherein a monitoring module, on the basis of the variable mood variable, triggers following a determinable event, the triggering occurring independence on the time variation of the mood variable.

21. A memory device storing software code sections which, when executed by a computer, perform the method according to claim 1.

22. A system for user-controlled multi-dimensional navigation in multimedia data, comprising:
a topological navigation map comprising a multiplicity of selectable node elements, a node element comprising one or more search terms or weighting terms that can be logically combined;
wherein distances within the navigation map are determined in dependence on relevance index parameters on the basis of one- or multi-dimensional distance factors, the absolute value of the corresponding distance factor becoming smaller with increasing relevance of two paired multimedia data elements with respect to one another; and
a topological input device by which the topological navigation map is navigable for the user and at least one of the required multimedia data elements and node elements are accessible,
wherein
for navigation in the topological navigation map by the user, at least one of required node elements and multimedia data elements and produced clusters of node elements are selected by the input device and the topological navigation map is corrected in a perspective of at least three-dimensions on the basis of the selection and newly displayed,
the topological navigation map displays a dynamic and moveable at least three-dimensional perspective for user navigation therethrough in order to respond in real-time by displaying changes in the distance factors of the relevance index parameters indicative of changes in said relevance of two paired multimedia data elements with respect to one another,
the topological navigation map is navigable through use of an input device to permit user access to at least one of desired multimedia data elements and node elements.

23. The system as claimed in claim 22, wherein the navigation map is navigable by topographic input device having at least one graphical, two-dimensional input element for the user.

24. The system as claimed in claim 22, further comprising a spring model module that determines the distance factors.

25. The system as claimed in claim 22, further comprising a maximum entropy module that determines the distance factors.

26. The system as claimed in claim 22, wherein at least one of the relevance index parameters and distance factors are determined dynamically on the basis of the selection of one of a node element or multimedia data element.

27. The system as claimed in claim 22, wherein the node element, on the basis of which the first display of the navigation map is generated, takes place by selection of one or more search terms by the user.

* * * * *